US006543670B2

(12) United States Patent
Mahoney

(10) Patent No.: US 6,543,670 B2
(45) Date of Patent: Apr. 8, 2003

(54) INTERFACE PREPARATION FOR WELD JOINTS

(75) Inventor: Murray W. Mahoney, Camarillo, CA (US)

(73) Assignee: The Boeing Company, Seattle, WA (US)

(*) Notice: Subject to any disclaimer, the term of this patent is extended or adjusted under 35 U.S.C. 154(b) by 8 days.

(21) Appl. No.: 09/941,880

(22) Filed: Aug. 29, 2001

(65) Prior Publication Data

US 2003/0042291 A1 Mar. 6, 2003

(51) Int. Cl.[7] .................. B23K 20/12; B23K 31/12; B32B 15/20
(52) U.S. Cl. ............... 228/112.1; 228/246; 428/615; 428/650; 403/272
(58) Field of Search .................. 228/246, 112.1, 228/2.1, 245; 403/270, 271, 272; 428/544, 594, 615, 650

(56) References Cited

U.S. PATENT DOCUMENTS 5,971,252 A * 10/1999 Rosen et al.
6,045,028 A * 4/2000 Martin et al.
6,053,391 A  4/2000 Heideman et al.
6,237,835 B1 * 5/2001 Litwinski et al.
6,315,187 B1 * 11/2001 Satou et al.
2002/0027154 A1 * 3/2002 Satou et al.
2002/0079351 A1 * 6/2002 Mishra et al.

FOREIGN PATENT DOCUMENTS

| JP | 411010368 A | * | 1/1999 |
| JP | 02000176658 A | * | 6/2000 |
| JP | 02002153976 A | * | 5/2002 |
| JP | 02001205457 A | * | 7/2002 |

* cited by examiner

Primary Examiner—Tom Dunn
Assistant Examiner—Kiley Stoner
(74) Attorney, Agent, or Firm—Alston & Bird LLP

(57) ABSTRACT

The present invention provides a structural assembly comprising a first workpiece and a second workpiece. The second workpiece at least partially underlies the first workpiece so as to define an interface therebetween. The assembly includes a friction stir weld joint joining the first and second workpieces. The assembly also includes an interface layer positioned between the first and second workpieces. The interface layer comprises a material having a melting temperature lower than the solidus temperatures of the first and second workpieces. The interface layer at least partially fills the interface proximate to the friction stir weld joint to thereby increase the strength and fracture toughness of the weld joint, as well as other mechanical and chemical properties, including resistance to crack growth and corrosion resistance.

22 Claims, 7 Drawing Sheets

INTERFACE PREPARATION FOR WELD JOINTS

FIELD OF THE INVENTION

The present invention relates to friction stir weld joints and, more particularly, relates to improving the material properties of a weld joint through interface preparation.

BACKGROUND OF THE INVENTION

Friction stir welding is a relatively new process using a rotating tool having a pin or probe and a concave shoulder to join two workpieces in a solid state or to repair cracks in a single workpiece. For example, such a process is described in U.S. Pat. No. 5,460,317 to Thomas et al., the contents of which are incorporated herein by reference. During friction stir welding, the rotating probe is plunged into a workpiece or between two workpieces by a friction stir welding machine to produce the required resistance force to generate sufficient frictional heating to form a region of plasticized material. The probe is typically threaded to effect mixing of the plasticized material to thereby create a homogenous weld joint. This mixing action is particularly advantageous when welding workpieces formed of different materials. The tool is typically tilted at an angle relative to the workpiece or workpieces such that the trailing edge of the tool shoulder is thrust into and consolidates the plasticized material. Upon cooling of the plasticized material, the workpieces are joined along the weld joint. The magnitude of force exerted by the friction stir welding tool must be maintained above a prescribed minimum in order to generate the required frictional heating.

Friction stir welding is suitable for welding a variety of joint configurations, including butt joints, tee joints, corner joints, edge joints, lap joints and combinations of these. FIG. 1 illustrates a typical butt joint between two workpieces 11 wherein the faying surfaces of the two workpieces, i.e., the surfaces of the workpieces to be joined together, define an interface 13 that is in a plane parallel to the axis 15 of the friction stir welding tool 17. The friction stir welding tool 17 will plasticize the workpiece material proximate to the interface 13 and mix the material from side to side and top to bottom. The mixing action will remain fairly uniform and symmetric provided the welding parameters are maintained constant and the friction stir welding tool 17 remains on the centerline of the interface 13 defined by the two workpieces 11.

In contrast, as illustrated in FIGS. 2A–2E, at least some of the faying surfaces of workpieces 11 forming tee joints, edge joints, corner joints and lap joints, respectively, define interfaces 13 that are in planes generally perpendicular or transverse or both to the axis 15 of the friction stir welding tool 17. As illustrated in FIG. 3, the mixing action of the probe 17a of the friction stir welding tool 17 through a perpendicular or transverse workpiece interface 13 creates an uplift of material from the workpiece 11b farthest from the friction stir welding tool 17. The uplift of material results in a thinning of the workpiece 11a closest to the friction stir welding tool 17. In addition, the "interface notch" 21 or portion of the workpiece interface 13 adjacent the weld joint 19 that is not consumed in the weld microstructure is typically moved with the uplifted material towards the edge of the workpiece 11a resulting in a stress concentration adjacent the weld joint. These conditions result in a weld joint 19 with low tensile and fatigue strength, and low fracture toughness.

Additionally, following friction stir welding, both the weld joint 19 and the heat affected zone, i.e., the portions of the workpieces 11a, b adjacent the weld joint, are more sensitive to corrosion attack from the ambient environment. As illustrated in FIG. 3, because the non-consumed portion of the interface 13 is not bonded, moisture can migrate down the interface and collect at the interface notch 21 adjacent the weld joint 19. This condition can result in a structural assembly having reduced corrosion resistance.

Thus, there is a need for an improved method of friction stir welding structural assemblies having interfaces that are perpendicular or transverse to the axis of the friction stir welding tool. The improved method should provide weld joints with high strength and fracture toughness, as well as other improved mechanical and chemical properties, including resistance to crack growth and corrosion resistance.

SUMMARY OF THE INVENTION

The present invention provides a method of strengthening a friction stir weld joint. According to one embodiment, the method includes forming a friction stir weld joint between first and second workpieces such that the first and second workpieces define at least one interface notch therebetween. As discussed above, the "interface notch" is the portion of the workpiece interface adjacent the weld joint that is not consumed in the weld microstructure. Concurrently with the forming step, an interface layer positioned between the first and second workpieces is at least partially melted. The interface layer has a melting temperature lower than the solidus temperatures of the first and second workpieces so that, as the first and second workpieces are plasticized by the probe and shoulder of the friction stir welding tool, the interface layer melts from the heat generated through the friction stir welding process. The melted portion of the interface layer is then allowed to cool. Concurrently with the cooling step, the at least one interface notch is relocated away from the weld joint to thereby reduce the stress concentration adjacent the weld joint. In one embodiment, the weld joint is at least partially encased with the interface layer concurrently with the cooling step to thereby improve the corrosion resistance of the weld joint. In another embodiment, a boundary layer is formed adjacent to the weld joint, and wherein the boundary layer has a hardness less than the hardness of the weld joint to thereby improve the crack resistance of the weld joint. In yet another embodiment, the interface layer is partially diffused into the weld joint to thereby improve the mechanical and/or chemical properties of the weld joint.

The present invention also provides a method of manufacturing a structural assembly. According to one embodiment, the method includes providing a first workpiece defining a first faying surface. A second workpiece is provided defining a second faying surface. An interface layer is provided, the interface layer comprising a material having a melting temperature lower than the solidus temperatures of the first and second workpieces so that, as the first and second workpieces are plasticized by the probe and shoulder of the friction stir welding tool, the interface layer melts from the heat generated through the friction stir welding process. In one embodiment, the method includes placing the interface layer onto at least one of the first and second faying surfaces. In one embodiment, the placing step comprises positioning at least one layer of foil onto at least one of the first and second faying surfaces. In another embodiment, the placing step comprises at least partially coating at least one of the first and second faying surfaces with the interface layer. The first faying surface of the first workpiece is positioned adjacent to the second faying surface of the second workpiece such that the interface layer is positioned therebetween. The first and second workpieces are secured so as to prevent movement of the first workpiece relative to the second workpiece. A rotating friction stir welding probe is then inserted through the first workpiece and the interface layer and into the second workpiece to form a friction stir weld joint between the first and second workpieces and to at least partially melt the interface layer proximate to the probe to thereby increase the strength, corrosion resistance and fracture toughness of the weld joint. In one embodiment, the method comprises cooling the interface layer to at least partially encase the weld joint with the interface layer to thereby improve the corrosion resistance of the weld joint. In another embodiment, a boundary layer is formed adjacent to the weld joint, and wherein the boundary layer has a hardness less than the hardness of the weld joint to thereby improve the crack resistance of the weld joint. In still another embodiment, the interface layer is partially diffused into the weld joint to enhance the mechanical and/or chemical properties of the weld joint.

The present invention also provides a structural assembly comprising a first workpiece and a second workpiece. The first and second workpieces are positioned at least partially adjacent to each other so as to define an interface therebetween. In one embodiment, the first and second workpieces comprise dissimilar metals. In another embodiment, the first and second workpieces are formed of titanium, aluminum, AA 2000 series aluminum alloys, AA 5000 series aluminum alloys, AA 6000 series aluminum alloys, AA 7000 series aluminum alloys, aluminum-lithium alloys, ferrous alloys, bronze, and/or copper. In one embodiment, at least one of the first and second workpieces is comprised of an unweldable material, i.e., a material not generally weldable using conventional fusion welding techniques. The assembly includes a friction stir weld joint joining the first and second workpieces. In one embodiment, the assembly includes a plurality of friction stir weld joints joining the first and second workpieces. The assembly also includes an interface layer positioned between the first and second workpieces. The interface layer comprises a material having a melting temperature lower than the solidus temperatures of the first and second workpieces. In one embodiment, the interface layer has a melting temperature of less than about 500° C. In one embodiment, the interface layer comprises a tin-based alloy or a zinc-based alloy. In another embodiment, the interface layer comprises ceramic particulate in a metal matrix. In another embodiment, the interface layer is multi-layered. In still another embodiment, the interface layer comprises a metal having an electrical conductivity of about equal to the electrical conductivity of at least one of the first and second workpieces. In still another embodiment, the interface layer has a thickness of between about 1 mil and about 5 mils. Advantageously, the interface layer at least partially fills the interface proximate to the friction stir weld joint to thereby increase the strength and fracture toughness of the weld joint, as well as other mechanical and chemical properties, including resistance to crack growth and corrosion resistance.

Accordingly, there has been provided an improved method of friction stir welding structural assemblies having interfaces that are perpendicular or transverse to the axis of the friction stir welding tool. The improved method will provide weld joints with high strength and fracture toughness, as well as other improved mechanical and chemical properties, including resistance to crack growth and corrosion resistance.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 6:
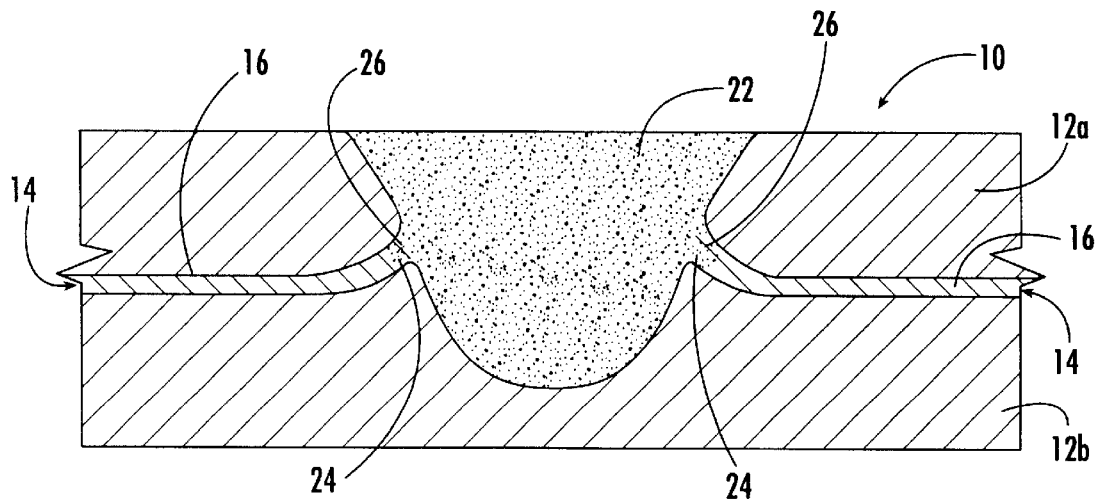
FIG. 6 is a partial cross-sectional view illustrating the friction stir weld joint formed between the workpieces and interface layer of FIG. 4B using a rotating friction stir welding tool.

Referring now to the drawings, and in particular to FIG. 6, there is illustrated a structural assembly 10, according to one embodiment of the present invention. The structural assembly 10 includes a first workpiece 12a and a second workpiece 12b. While two workpieces are illustrated in the Figures, it should be appreciated by one skilled in the art that the present invention is also applicable to joints comprising three or more stacked workpieces. The first and second workpieces 12a, b are positioned at least partially adjacent to each other so as to define an interface 14 therebetween. For example, as illustrated in FIG. 6, the second workpiece 12b at least partially underlies the first workpiece 12a to thereby define the interface 14. Depending on the orientation of the structural assembly 10 and the particular application, the second workpiece 12b can overlie the first workpiece 12a or, alternatively, the first and second workpieces can be positioned side by side such that neither workpiece "overlies" the other. Thus, FIG. 6 is for purposes of example only and not limitation, as variations in the orientation of the first and second workpieces 12a, b are considered to be within the scope of the present invention. The first and second workpieces 12a, b can each be machined, through known manufacturing means, from a single cast, forged or extruded workpiece into a predetermined shape and thickness as required by the specific design loads and specifications. The first and second workpieces 12a, b can also be formed, through known manufacturing means, into a curvilinear geometry.

The first and second workpieces 12a, b can be formed of a variety of materials, including titanium, aluminum, AA 2000 series aluminum alloys, AA 5000 series aluminum alloys, AA 6000 series aluminum alloys, AA 7000 series aluminum alloys, aluminum-lithium alloys, ferrous alloys, bronze, and/or copper. The first and second workpieces 12a, b can be formed of either similar or dissimilar alloys of the same base metal. Because friction stir welding is a solid state welding process, the first and second workpieces 12a, b can be formed of metals that would be unweldable or uneconomical to join by any other means. "Unweldable" materials are materials that possess high conductivity and quickly dissipate heat away from the weld joint and/or that exhibit cracking along the weld joint as a result of stresses caused by thermal expansion. Such materials can include titanium, aluminum, aluminum alloys, and some alloys of titanium, particularly Ti-6Al-4V, AA 2000 and 7000 series alloys. Advantageously, many of these materials possess special corrosion, fatigue, strength, or ductility characteristics that are desired in certain applications. Thus, the materials which form the first and second workpieces 12a, b can be chosen from a wide variety of lightweight, high strength metals and alloys, thereby facilitating reduction of the overall weight of the structure assembly. Weight and strength are of critical concern in the aerospace industry.

As illustrated in FIG. 6, the structural assembly 10 also includes an interface layer 16 positioned between the first and second workpieces 12a, b. The interface layer 16 can be formed of a variety of materials. For example, when first and second workpieces 12a, b are formed of aluminum alloys, the interface layer 16 can be formed of tin-based alloys or zinc-based alloys. The interface layer 16 preferably comprises a material having a melting temperature lower than the solidus temperature of the first and second workpieces 12a, b. The "solidus" temperature of a particular alloy is the temperature below which only a solid is stable. As such, the composition of the interface layer 16 and the corresponding melting temperature will be dependent upon the composition of the first and second workpieces 12a, b and their corresponding solidus temperatures. For purposes of example only and not limitation, when the first and second workpieces 12a, b are formed of aluminum alloys, the interface layer 16 generally will have a melting temperature of less than about 500° C. For example, zinc-based alloys typically have a melting temperature of less than about 420° C. and tin-based alloys typically have a melting temperature of less than about 240° C. For first and second workpieces 12a, b formed of bronze or copper alloys, the interface layer 16 melting temperature should be below about 1000° C. The interface layer 16 melting temperature preferably is relatively low in comparison to the solidus temperature of the first and second workpieces 12a, b to facilitate complete flow and fill of the interface 14 while at the same time having sufficient solidified strength to meet the structural requirements of the particular application.

In certain applications, it can be desirable for the structural assembly 10 to posses certain electrical properties. Thus, according to one embodiment of the present invention, the interface layer 16 can comprise a material have a relatively high electrical conductivity. For purposes of example and not limitation, the interface layer 16 can include a material having an electrical conductivity about equal to the electrical conductivity of at least one of the first and second workpieces 12a, b.

Figure 4B:
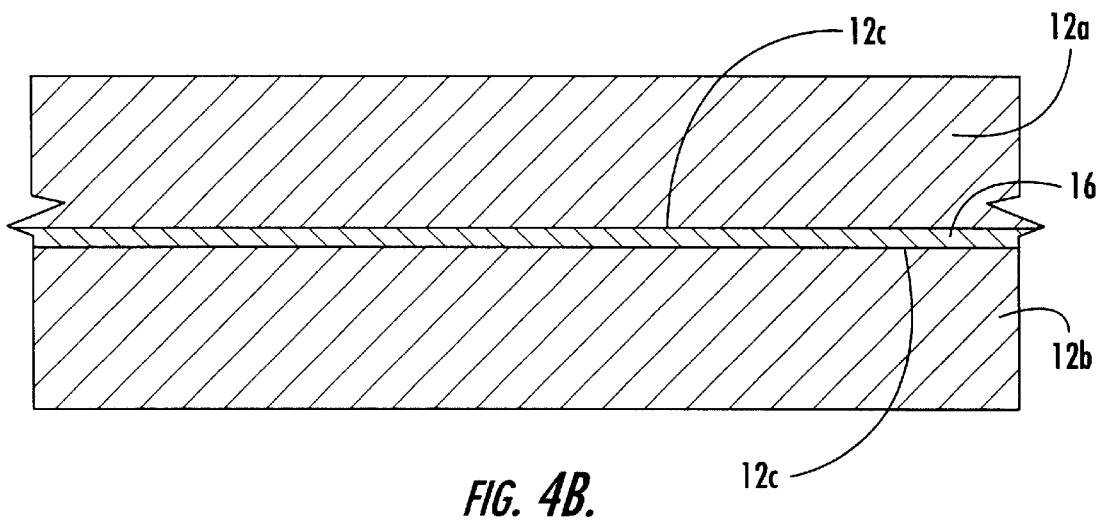
FIG. 4B is a partial cross-sectional view illustrating the positioning of the first and second workpieces with the interface layer of FIG. 4A therebetween.
Figure 4A:
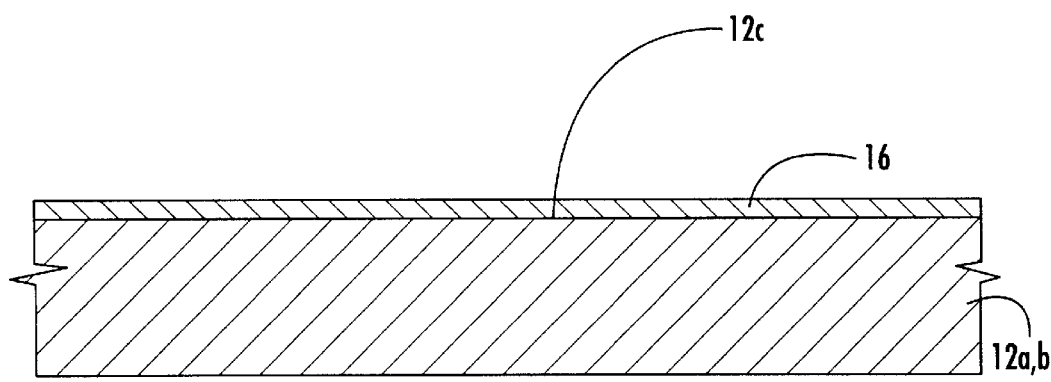
FIG. 4A is a partial cross-sectional view illustrating the placing of the interface layer on between two workpieces, according to one embodiment of the present invention.

As illustrated in FIGS. 4A and 4B, the structural assembly 10 is constructed by placing an interface layer 16 onto the faying surface 12c of one or both of the first and second workpieces 12a, b. For example, the interface layer 16 can be placed onto the corresponding faying surface(s) by coating the faying surface(s) 12c by different means. For purposes of example and not limitation, the corresponding faying surface(s) 12c can be coated by chemical vapor deposition, plasma spraying, physical vapor deposition, and/or electrochemical deposition. Multiple layers of the coating can be applied to achieve the desired thickness for the interface layer 16. Alternatively, the interface layer 16 can comprise one or more layers of foil that are positioned on the faying surface 12c of the corresponding workpiece 12a, b. In still another embodiment, the interface layer 16 can comprise metal powder placed on the faying surface 12c of the corresponding workpiece 12a, b. The thickness of the interface layer 16 can vary depending on such factors as the material composition and dimensions of the first and second workpieces 12a, b, the material composition of the interface layer, and/or the structural and chemical property requirements of the particular application. In one embodiment, the interface layer 16 has a thickness of between about 1 mil and about 5 mils, although the thickness can be greater than or less than this range.

As illustrated in FIG. 4B, the faying surface 12c of the first workpiece 12a is then positioned adjacent to the faying surface 12c of the second workpiece 12b, such that the interface layer 16 is positioned therebetween. The first and second workpieces 12a, b are then secured so as to prevent motion of the first workpiece 12a relative to the second workpiece 12b. For instance, the first and second workpieces 12a, b may be secured to each other by spot welding. Then, the first and second workpieces 12a, b may be secured to the work table or other backing device by means of a conventional clamp (not shown).

Figure 5:
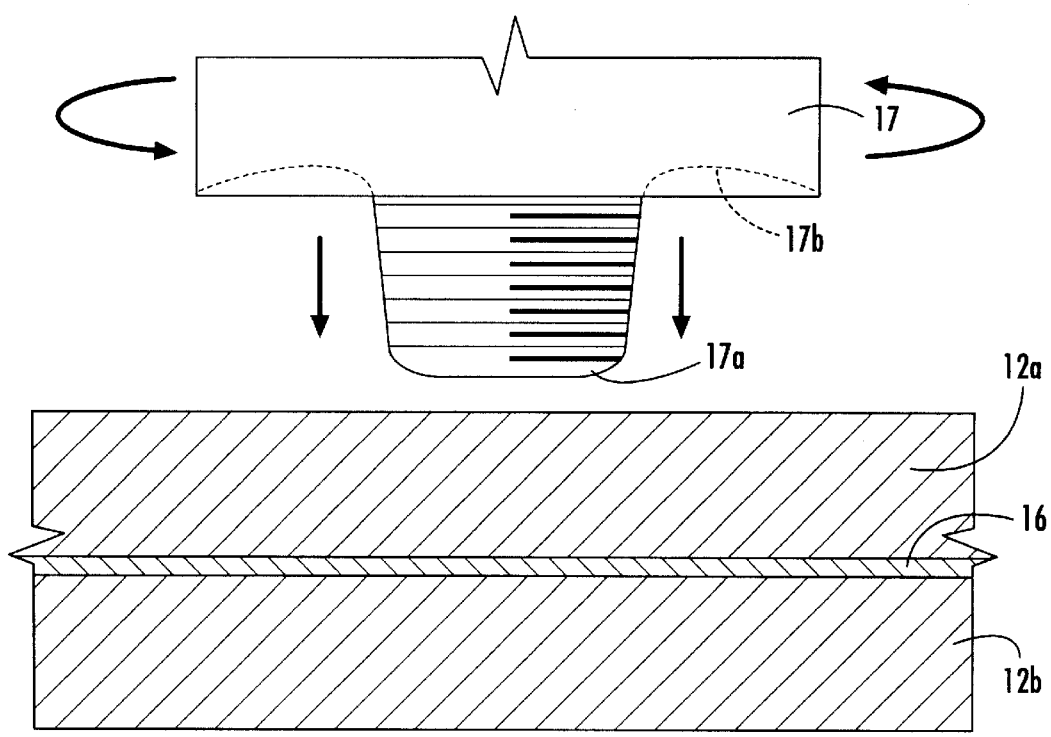
FIG. 5 is a partial cross-sectional view illustrating the workpieces and interface layer of FIG. 4B prior to friction stir welding.

The first and second workpieces 12a, b are then joined by friction stir welding. Specifically, as illustrated by the arrows in FIG. 5, a rotating probe 17a of a friction stir welding tool 17 is forced through the first workpiece 12a, through the interface layer 16 and into the second workpiece 12b. The frictional heat generated by the rotating probe 17a creates a plasticized region that is consolidated by the shoulder 17b of the friction stir welding tool 17. As illustrated in FIG. 6, the plasticized region will cool between the first and second workpieces 12a, b to form a friction stir weld joint 22. The rotating probe 17a preferably is moved along a predetermined path through the first and second workpieces 12a, b and interface layer 16 to thereby form a continuous friction stir weld joint 22 along the length of the first and second workpieces. This friction stir welding process can then be repeated, as necessary. See U.S. Pat. No. 5,460,317 to Thomas et al. general discussion of friction stir welding, the contents of which are incorporated herein by reference.

Figure 1:
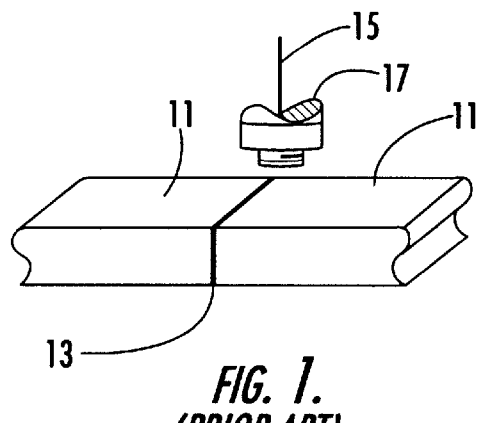
FIG. 1 is an elevation illustrating a butt joint, as is known in the art.
Figure 2A:
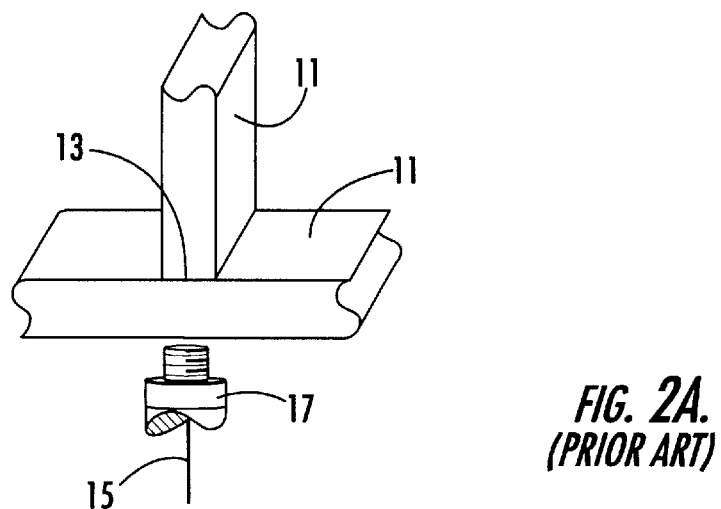
FIG. 2A is an elevation illustrating a Tee joint, as is known in the art.
Figure 2B:
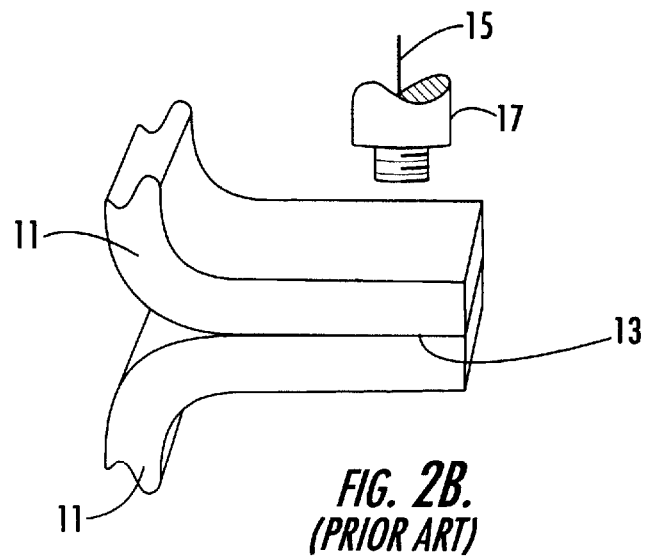
FIG. 2B is an elevation illustrating an edge joint, as is known in the art.
Figure 2C:
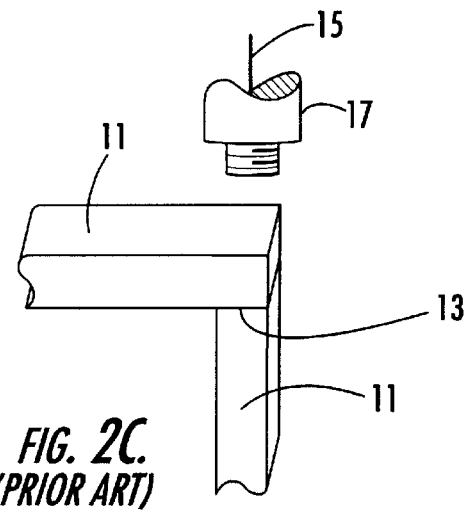
FIG. 2C is an elevation illustrating a corner joint, as is known in the art.
Figure 2D:
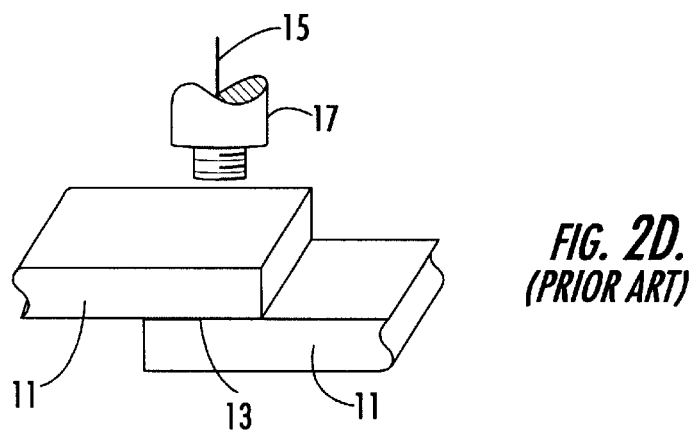
FIG. 2D is an elevation illustrating a lap joint, as is known in the art.
Figure 2E:
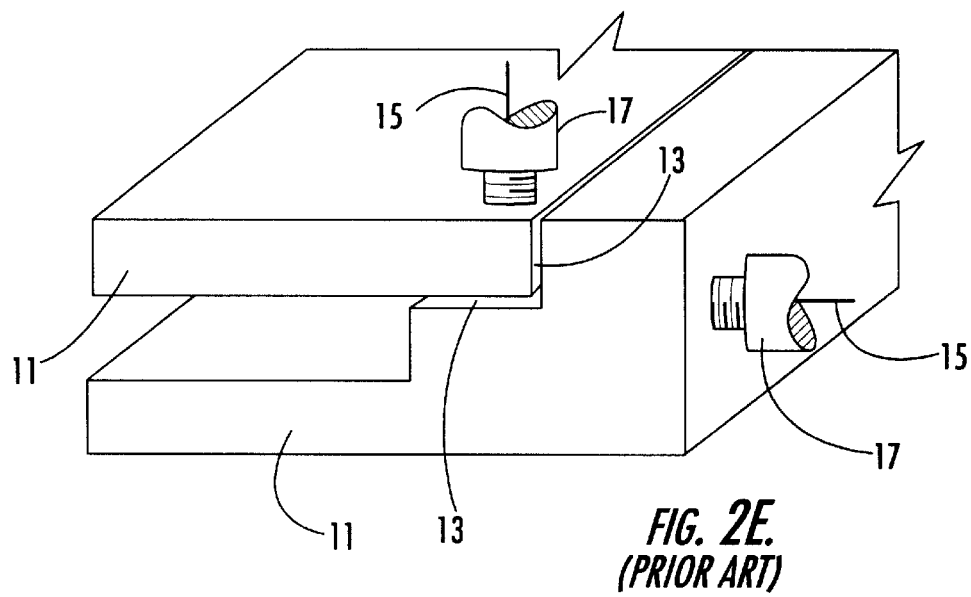
FIG. 2E is an elevation illustrating a combined butt and lap joint, as is known in the art.
Figure 3:
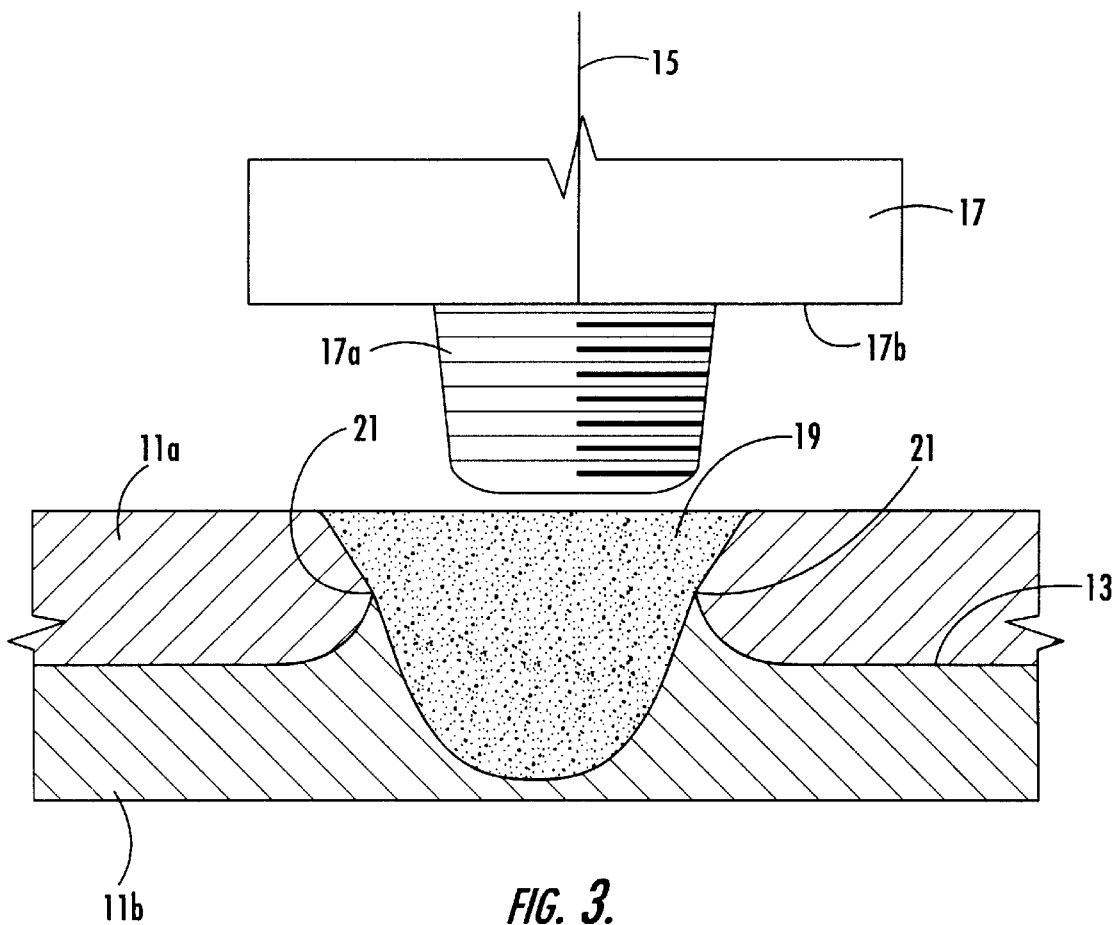
FIG. 3 is a partial cross-sectional view illustrating the thinning effect when friction stir welding workpieces having an interface perpendicular or transverse to the axis of the tool probe, as is known in the art.

As discussed above and as illustrated in FIG. 3, a sharp interface notch 21 between the workpieces 11a, b typically is produced when forming a friction stir weld joint through a workpiece interface 13 perpendicular or transverse to the axis 15 of the friction stir welding tool 17. Such an interface notch 21 usually generates a stress concentration adjacent the weld joint 19 that can adversely affect the tensile and fatigue strength and fracture toughness of the weld joint. Advantageously, the present invention relocates the interface notch defined by the first and second workpieces away from the weld joint. As illustrated in FIG. 6, during friction stir welding some of the interface layer 16 will be consumed and homogeneously distributed throughout the weld joint 22 by the rotating friction stir welding tool 17. However, in the heat affected zone adjacent to the weld joint 22, the temperature is relatively high such that the portion of the interface layer 16 within the heat affected zone will at least partially melt and then subsequently solidify within the interface 14 as the probe passes. More specifically, the portion of the interface layer 16 proximate to the rotating probe 17a will melt as a result of the frictional heat generated by the rotating probe. The melted portion of the interface layer 16 will fill the interface region 24 between the first and second workpieces 12a, b adjacent the weld joint 22 with a relatively soft and ductile metal or boundary layer 26. As the melted portion of the interface layer 16 fills the interface region 24 between the first and second workpieces 12a, b adjacent to the weld joint 22 the interface notch defined by the first and second workpieces is relocated away from the weld joint 22.

In addition, because the interface layer 16 is a relatively soft and ductile metal, any interface notch between the first and second workpieces 12a, b and the boundary layer 26 portion of the interface layer 16 will be blunted. More specifically, when melted, the interface layer 16 will react with, or diffuse into, the faying surfaces 12c to form a relatively strong material bond. The material bonds between the first and second workpieces 12a, b and the interface layer 16, respectively, each preferably have strength approximately equal to or greater than the yield strength of the interface layer such that the interface layer will yield and blunt any interface notch between the first and second workpieces and the boundary layer 26 portion of the interface layer.

Figure 7:
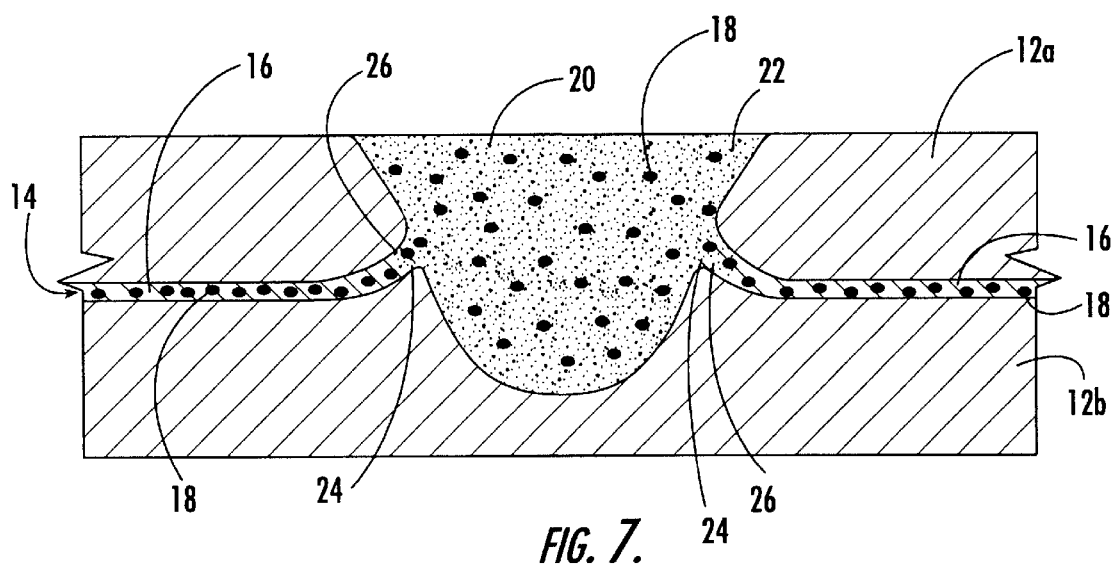
FIG. 7 is a partial cross-sectional view illustrating a friction stir weld joint formed between two workpieces and an interface layer wherein the interface layer includes ceramic particulate in a metal matrix, according to one embodiment of the present invention.

The interface layer 16 also provides other advantages in terms of improving the mechanical and chemical properties of the weld joint 22. For example, diffusion of the interface layer 16 into the metal matrix 20 of the weld joint 22 can be used to form a weld joint having a supersaturated solution to thereby improve the mechanical and chemical properties of the weld joint. In addition, the mixing action of the rotating friction stir welding tool 17 can be used to mechanically mix the interface layer into the metal matrix 20 of the weld joint 22 to thereby improve the mechanical and chemical properties of the weld joint. According to one embodiment of the present invention, as illustrated in FIG. 7, the interface layer 16 can include ceramic particulate 18 that will be mechanically mixed into the metal matrix 20 of the weld joint 22 by the mixing action of the rotating friction stir welding tool 17. The ceramic particulate 18 will impede motion of dislocations in the weld joint 22 thereby further increasing the tensile strength and hardness of the weld joint.

Advantageously, the interface layer 16 also provides the weld joint with improved corrosion resistance and improved resistance to crack growth, as well as reduces the effects of upper sheet thinning. Upon cooling of the melted portion of the interface layer 16 between the first and second workpieces 12a, b, the weld joint 22 will include a relatively soft and ductile metal or boundary layer 26, as discussed above, that fills the interface region 24, including the deformed zone adjacent to the weld joint. The introduction of the boundary layer 26 at least partially encases the weld joint 22 thereby sealing portions of the weld joint from the ambient environment to provide increased corrosion resistance. In addition, the relatively soft and ductile boundary layer 26 preferably has a hardness less than the hardness of the weld joint 22 such that the boundary layer will yield in response to stresses that would normally result in crack propagation through the weld joint thereby improving the weld joint's resistance to crack growth. By filling the interface region 24 with additional material, the interface layer 16 also reduces the effect of upper sheet thinning.

The present invention provides a method that is particularly advantageous for welding structural assemblies having interfaces that are perpendicular or transverse to the axis of the friction stir welding tool. However, the method of the present invention also may be used to weld interfaces that are parallel to the axis of the friction stir welding tool in order to enhance the mechanical and/or chemical properties of such weld joints.

Figure 8:
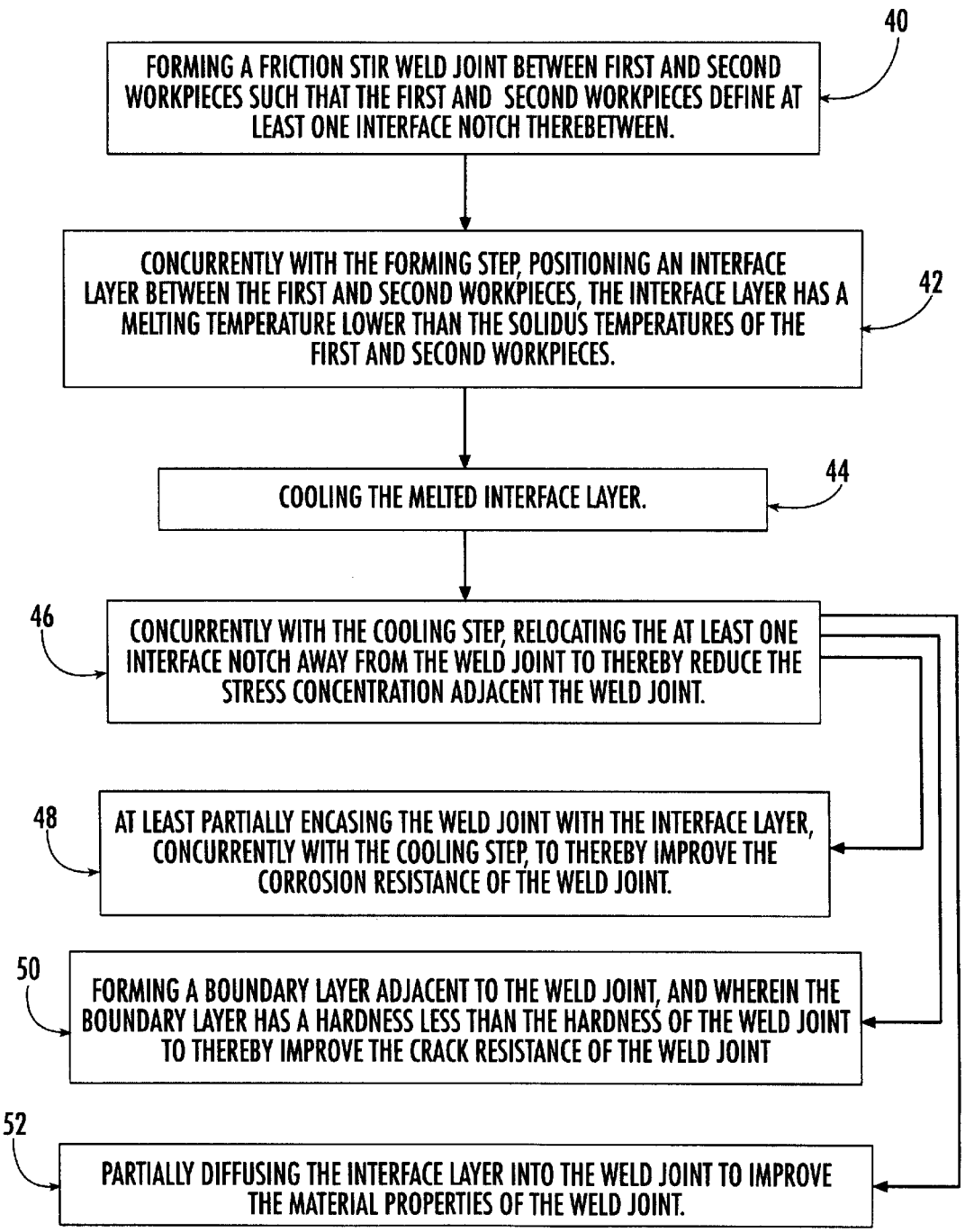
FIG. 8 is a flow chart illustrating the steps for strengthening a friction stir weld joint, according to one embodiment of the present invention.

Referring to FIG. 8, the present invention also provides a method of strengthening a friction stir weld joint. According to one embodiment, the method includes forming a friction stir weld joint between first and second workpieces such that the first and second workpieces define at least one interface notch therebetween. See Block 40. As discussed above, the "interface notch" is the portion of the workpiece interface adjacent the weld joint that is not consumed in the weld microstructure. Concurrently with the forming step, an interface layer positioned between the first and second workpieces is at least partially melted. See Block 42. The interface layer has a melting temperature lower than the solidus temperatures of the first and second workpieces so that, as the first and second workpieces are plasticized by the probe and shoulder of the friction stir welding tool, the interface layer melts from the heat generated through the friction stir welding process. The melted portion of the interface layer is then allowed to cool. See Block 44. Concurrently with the cooling step, the at least one interface notch is relocated away from the weld joint to thereby reduce the stress concentration adjacent the weld joint. See Block 46. In one embodiment, the weld joint is at least partially encased with the interface layer concurrently with the cooling step to thereby improve the corrosion resistance of the weld joint. See Block 48. In another embodiment, a boundary layer is formed adjacent to the weld joint, and wherein the boundary layer has a hardness less than the hardness of the weld joint to thereby improve the crack resistance of the weld joint. See Block 50. In yet another embodiment, the interface layer is partially diffused into the weld joint to thereby improve the mechanical and/or chemical properties of the weld joint. See Block 52.

Figure 9:
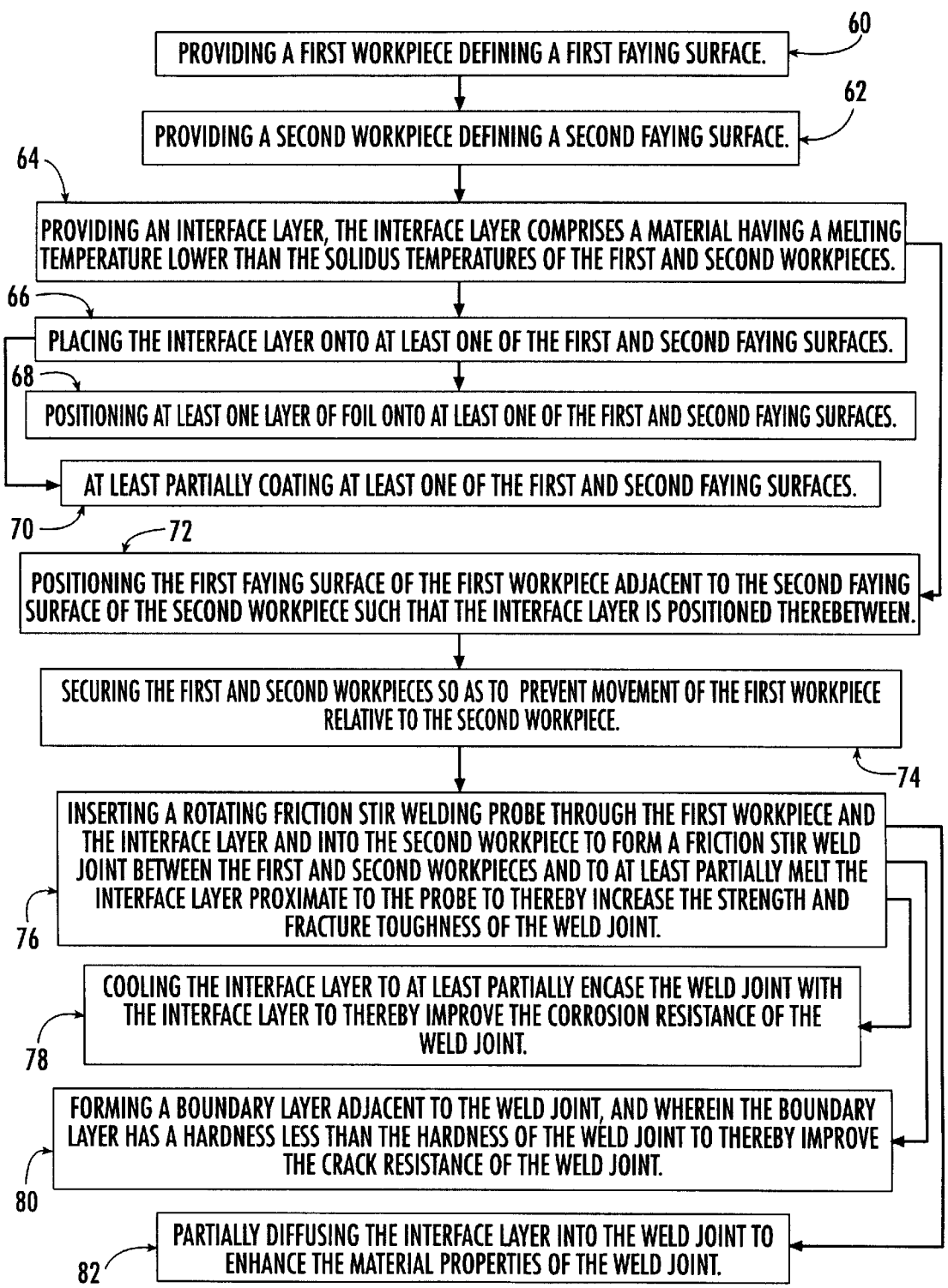
FIG. 9 is a flow chart illustrating the steps for manufacturing a structural assembly, according to one embodiment of the present invention.

Referring to FIG. 9, the present invention also provides a method of manufacturing a structural assembly. According to one embodiment, the method includes providing a first workpiece defining a first faying surface. See Block 60. A second workpiece is provided defining a second faying surface. See Block 62. An interface layer is provided, the interface layer comprising a material having a melting temperature lower than the solidus temperatures of the first and second workpieces so that, as the first and second workpieces are plasticized by the probe and shoulder of the friction stir welding tool, the interface layer melts from the heat generated through the friction stir welding process. See Block 64. In one embodiment, the method includes placing the interface layer onto at least one of the first and second faying surfaces. See Block 66. In one embodiment, the placing step comprises positioning at least one layer of foil onto at least one of the first and second faying surfaces. See Block 68. In another embodiment, the placing step comprises at least partially coating at least one of the first and second faying surfaces with the interface layer. See Block 70. The first faying surface of the first workpiece is then positioned adjacent to the second faying surface of the second workpiece such that the interface layer is positioned therebetween. See Block 72. The first and second workpieces are secured so as to prevent movement of the first workpiece relative to the second workpiece. See Block 74. A rotating friction stir welding probe is then inserted through the first workpiece and the interface layer and into the second workpiece to form a friction stir weld joint between the first and second workpieces and to at least partially melt the interface layer proximate to the probe to thereby increase the strength and fracture toughness of the weld joint. See Block 76. In one embodiment, the method comprises cooling the interface layer to at least partially encase the weld joint with the interface layer to thereby improve the corrosion resistance of the weld joint. See Block 78. In another embodiment, a boundary layer is formed adjacent to the weld joint, and wherein the boundary layer has a hardness less than the hardness of the weld joint to thereby improve the crack resistance of the weld joint. See Block 80. In still another embodiment, the interfacing layer is partially diffused into the weld joint to enhance the mechanical and/or chemical properties of the weld joint. See Block 82.

Accordingly, there has been provided an improved method of friction stir welding structural assemblies having interfaces that are perpendicular or transverse to the axis of the friction stir welding tool. Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of strengthening a friction stir weld joint, comprising:

forming a friction stir weld joint between first and second workpieces such that the first and second workpieces define at least one interface notch therebetween;

concurrently with said forming step, at least partially melting an interface layer positioned between the first and second workpieces, the interface layer having a melting temperature lower than the solidus temperatures of the first and second workpieces;

cooling the melted portion of the interface layer; and concurrently with said cooling step, relocating the at least one interface notch away from the weld joint to thereby reduce the stress concentration adjacent the weld joint.

2. A method according to claim 1 further comprising at least partially encasing the weld joint with the interface layer, concurrently with said cooling step, to thereby improve the corrosion resistance of the weld joint.

3. A method according to claim 1 further comprising forming a boundary layer adjacent to the weld joint, and wherein the boundary layer has a hardness less than the hardness of the weld joint to thereby improve the crack resistance of the weld joint.

4. A method according to claim 1 further comprising partially diffusing the interface layer into the weld joint.

5. A method of manufacturing a structural assembly, comprising:

providing a first workpiece defining a first faying surface;

providing a second workpiece defining a second faying surface;

providing an interface layer, the interface layer comprising a material having a melting temperature lower than the solidus temperatures of the first and second workpieces;

positioning the first faying surface of the first workpiece adjacent to the second faying surface of the second workpiece such that the interface layer is positioned therebetween;

securing the first and second workpieces so as to prevent movement of the first workpiece relative to the second workpiece; and inserting a rotating friction stir welding probe through the first workpiece and the interface layer and into the second workpiece to form a friction stir weld joint between the first and second workpieces and to at least partially melt the interface layer proximate to the probe to thereby increase the strength and fracture toughness of the weld joint.

6. A method according to claim 5 further comprising placing the interface layer on at least one of the first and second faying surfaces of the first and second workpieces.

7. A method according to claim 6 wherein said placing step comprises positioning at least one layer of foil onto at least one of the first and second faying surfaces.

8. A method according to claim 6 wherein said placing step comprises at least partially coating at least one of the first and second faying surfaces with the interface layer.

9. A method according to claim 5 further comprising cooling the interface layer to at least partially encase the weld joint with the interface layer to thereby improve the corrosion resistance of the weld joint.

10. A method according to claim 5 further comprising forming a boundary layer adjacent to the weld joint, and wherein the boundary layer has a hardness less than the hardness of the weld joint to thereby improve the crack resistance of the weld joint.

11. A method according to claim 5 further comprising partially diffusing the interfacing layer into the weld joint.

12. A structural assembly, comprising:

a first workpiece;

a second workpiece, said first and second workpieces being positioned at least partially adjacent to each other so as to define an interface therebetween;

a friction stir weld joint joining said first and second workpieces;

an interface layer positioned between said first and second workpieces, said interface layer comprising a material having a melting temperature lower than the solidus temperatures of said first and second workpieces, and wherein said interface layer at least partially fills said interface proximate to said friction stir weld joint to thereby increase the strength and fracture toughness of said weld joint.

13. The structural assembly of claim 12 wherein said first and second workpieces comprise dissimilar metals.

14. The structural assembly of claim 12 wherein said first and second workpieces are formed of materials selected from the group consisting of titanium, aluminum, AA 2000 series aluminum alloys, AA 5000 series aluminum alloys, AA 6000 series aluminum alloys, AA 7000 series aluminum alloys, aluminum-lithium alloys, ferrous alloys, bronze, and copper.

15. The structural assembly of claim 12 comprising a plurality of friction stir weld joints joining said first and second workpieces.

16. The structural assembly of claim 12 wherein at least one of said first and second workpieces is comprised of an unweldable material.

17. The structural assembly of claim 12 wherein said interface layer is formed of materials selected from the group consisting of a tin-based alloy and a zinc-based alloy.

18. The structural assembly of claim 12 wherein said interface layer is multi-layered.

19. The structural assembly of claim 12 wherein said interface layer comprises ceramic particulate in a metal matrix.

20. The structural assembly of claim 12 wherein said interface layer comprises a metal having an electrical conductivity of about equal to the electrical conductivity of at least one of the first and second workpieces.

21. The structural assembly according to claim 12 wherein said interface layer has a melting temperature of less than about 500° C.

22. The structural assembly according to claim 12 wherein said interface layer has a thickness of between about 1 mil to about 5 mils.

* * * * *